United States Patent [19]

Shalhoob

[11] Patent Number: 5,094,742
[45] Date of Patent: Mar. 10, 1992

[54] MAGNETIC WATER CONDITIONING SHOWER ARM

[76] Inventor: William N. Shalhoob, 453 Scenic Dr., Santa Barbara, Calif. 93103

[21] Appl. No.: 585,178

[22] Filed: Sep. 20, 1990

[51] Int. Cl.⁵ ............................................. C02F 1/48
[52] U.S. Cl. ................................. 210/222; 210/542; 210/695
[58] Field of Search ................ 210/222, 223, 542, 695

[56] References Cited

U.S. PATENT DOCUMENTS 4,216,092  8/1980  Shalhoob et al. .................. 210/222

FOREIGN PATENT DOCUMENTS

| 62-234589 | 10/1987 | Japan | 210/222 |
| 63-156592 | 6/1988 | Japan | 210/222 |
| 2132997A | 7/1984 | United Kingdom | 210/222 |
| 2221173A | 1/1990 | United Kingdom | 210/222 |

*Primary Examiner*—W. Gary Jones
*Assistant Examiner*—Matthew Savage
*Attorney, Agent, or Firm*—Kenneth E. Darnell

[57] ABSTRACT

A magnetic water conditioning shower arm disposed in a water circuit supplying a shower head terminating the water circuit, the device comprises magnetic elements disposed within a tubular pipe-like element for treatment of water flowing therethrough by magnetic lines of force. The shower arm is preferably disposed immediately before the shower head in the water circuit and can thus be easily retrofitted into existing shower apparatus as well as installed as part of an original shower apparatus. The shower arm is particularly useful for the treatment of water containing scale minerals which deposit on surfaces of a shower head and which often render such heads prematurely useless. Magnetic treatment of water containing scale minerals according to the invention and prior to contact of untreated water with a shower head inhibits scale formation caused by precipitation of calcium salts, magnesium salts and other mineral compounds, thereby extending the useful life of a shower head to that life normally expected.

7 Claims, 1 Drawing Sheet

MAGNETIC WATER CONDITIONING SHOWER ARM

BACKGROUND OF THE INVENTION

1. Field of the Invention

The invention relates generally to hydromagnetic devices and particularly to water conditioning devices which inhibit the formation of mineral scale on surfaces of a water circuit.

2. Description of the Prior Art

Magnetic field effects have previously been used in attempts to soften the scale-forming properties of water at least as early as 1865. Parry, in U.S. Pat. No. 50,773, describes the "conditioning" of water with a device employing a magnet. Early water conditioning devices and even those devices proposed up until approximately a dozen years ago have usually had little effect on corrosion of water-carrying pipes or other steel surfaces, scale formation on such surfaces being typically unaffected by prior devices until that time. A truly effective hydromagnetic device was described by Shalhoob et al in U.S. Pat. No. 4,216,092, this device having been proven in wide commercial use since its introduction into the marketplace over ten years ago. Shalhoob et al describe a coaxial hydromagnetic device in their patent, the device comprising magnets mounted within a non-ferrous receptacle and separated therein by plastic spacers. Respective adjacent poles of the magnets of Shalhoob et al are of like polarity. The Shalhoob et al device is supported within a water feed line within an outer tubular envelope formed of a non-ferrous material. The envelope of Shalhoob et al is provided with a number of spaced annular constrictions disposed in relation to the magnetic elements such that the flow of liquid through the device is increased in areas of substantial magnetic flux. Prior to the development of Shalhoob et al, water conditioning apparatus had been described by Sanderson in U.S. Pat. No. 3,951,807, the Sanderson device including axially aligned magnetic structures wherein like poles are disposed in contiguous relation. Similarly, Kottmeier, in U.S. Pat. No. 3,923,660, discloses a device for treating water with a magnetic field, the device including a plurality of magnets arranged axially with like poles of contiguous magnets arranged adjacent to each other to create lines of force extending laterally and longitudinally of the magnets. Happ et al describe, in U.S. Pat. Nos. 3,699,274, and 3,680,705, similar water conditioning devices. More recently, Moore, Jr. in U.S. Pat. No. 4,662,314, describes a scale inhibiting device used in a water heater inlet dip tube. While hydromagnetic devices are known in the art as is evidenced from the discussion provided, the art has not provided an easily installable device, either as retrofit or as original equipment, and which is also inexpensive and effective for preventing scale formation within shower heads such as exist in a domestic bath situation. The present invention particularly by providing structure capable of initiating auto-nucleation of scale within the bulk of a liquid passing through a water circuit, addresses the needs not met by the prior art so as to now warrant a greater usage of hydromagnetic devices for water conditioning purposes and especially within the environment of a domestic shower apparatus.

SUMMARY OF THE INVENTION

The invention provides a shower arm apparatus preferably disposed in a water circuit immediately before a shower head for treating water containing scale minerals to inhibit the adhesion of calcium and magnesium scale and similar scale-forming compounds to surfaces of the shower head. According to a particular teaching of the invention, two suitably shaped permanent magnets are located within a tubular shower arm in spaced apart relationship with like poles facing. The permanent magnets are preferably bar magnets having a rectangular solid conformation with a reduced height relative to width and length. In other words, the permanent magnets preferably used according to the invention are bar magnets which are substantially "flat". The permanent magnets are of a size which allows flush fitting within a cylindrical insert. Each permanent magnet is housed within such an insert and one of the insert/magnet assemblies is pressed into each end of the shower arm. The insert is sized such that the insert is flushly received within the end of the shower arm and is maintained therein by friction. The permanent magnet within each insert can either be maintained within the insert by friction or can be maintained by means of adhesive attachment or other attachment. Each insert has a Y-shaped baffle disposed at the distal end thereof, the baffle occupying about one-half of the interior body of the insert. In a typical assembly situation, the magnet does not fit fully into the insert and only about one-half of the magnet extends into the insert. Each permanent magnet is essentially centered within the shower arm with major planar faces of the magnet being perpendicular to one of the arms of the Y-shaped baffle or to the leg of the baffle. In essence, the two arms and the leg of the baffle are substantially equal and thus could all be referred to as arms or legs.

The shower arm is preferably formed with an arcuate interior portion which requires the water to undergo a change of direction after having passed through the up-stream insert/magnet assembly. Turbulence generated in the water flowing through the shower arm by the upstream baffle/magnet is intensified by the curvature of the shower arm immediately prior to passage through the downstream baffle/magnet which further conditions the water. Accordingly, favorable interactions between the electrically conductive flowing liquid which is to be conditioned, that is, the water flowing through the shower arm and then into the shower head, and the electrical potentials in currents thus generated, act to shift the usual precipitation of scale from surfaces of the shower head to precipitation within the water itself. The movement of water through the shower arm and turbulence induced within the water by means of the baffle structures and the disposition of the magnets themselves coupled with the magnetic fields produced by the magnets produce electrical voltages within the water which are greater than the activation potentials required for auto-nucleation.

The magnetic water conditioning shower arm of the invention is particularly useful within a shower apparatus to reduce the maintenance and extend the life of shower heads with which the present shower arms are used. The shower arms of the invention can particularly be inserted into water conduits which carry hot or cold water to a shower head and will act to inhibit calcium and other chemical deposits not only in the shower head but in the water conduits themselves without resorting to the use of a filter, water softener or chemical additive. The present shower arm structures also facilitate the removal of existing "scale" from water conduits and shower heads which already contain a build up of calcium and other chemical deposits. The invention may be used with water conduits and shower heads formed of copper, brass, plastic, or other non-ferrous, non-magnetic materials. In all such situations, flow of water through a shower arm of the invention results in a "cutting" of the magnetic field produced by the permanent magnets within the shower arm, activation potentials required for nucleation then being exceeded as aforesaid. Precipitate thus formed is then flushed from the water conduit through the shower head from the water system, thereby extending the useful life and reducing maintenance of shower apparatus and in particular shower heads.

It is therefore an object of the present invention to provide a hydromagnetic device in the form of a magnetic water conditioning shower arm which is capable of inhibiting adhesion of calcium and magnesium scale to surfaces of water conduits within a shower apparatus and/or shower heads and of initiating auto-nucleation of scale within the bulk of water passing through the shower arm, thereby to control the precipitation of scale by shifting scale precipitation from deposition on surfaces to precipitation upon itself within the water by auto-nucleation.

It is a further object of the invention to provide an extremely simple, inexpensive hydromagnetic device which combines hydromagnetic, electrokinetic, physico-chemical, nucleation and other phenomena in a single device to control scale precipitation, the present device further being operable without the need for moving parts or electrical power, the energy necessary to cause adequate functioning of the device being derived solely from the kinetic energy of the water moving relative to the device.

It is a further object of the present invention to provide a hydromagnetic device in the form of a shower arm to condition water within a water circuit supplying a shower head and to inhibit the formation of scale on surfaces of the water circuit and of the shower head, the shower arm being easily retrofit into existing shower apparatus or supplied as original equipment in such apparatus.

Further objects and advantages of the invention will become more readily apparent in light of the following detailed description of the preferred embodiment of the invention.

DESCRIPTION OF THE PREFERRED EMBODIMENT

Figure 1:
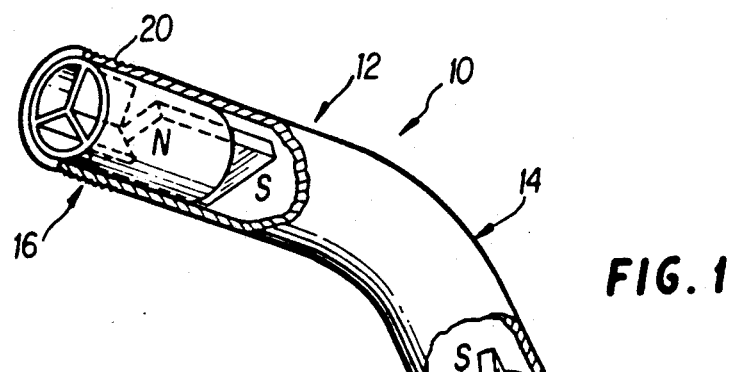
FIG. 1 is a perspective view in partial section of a preferred embodiment of the shower arm of the invention.
Figure 2:
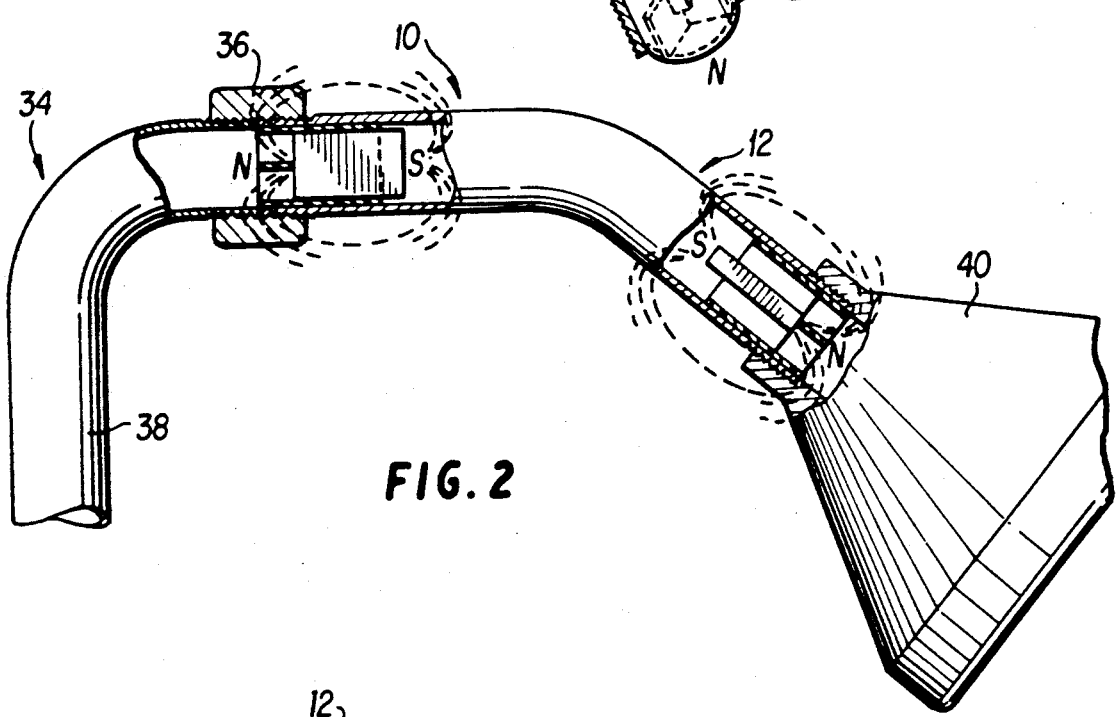
FIG. 2 is an elevational view in section of a shower arm of the invention disposed in a water circuit and attached to a conventional shower head; and, FIG. 3 is a perspective view of an insert/baffle structure which mounts a magnet within the shower arm of the invention.
Figure 3:
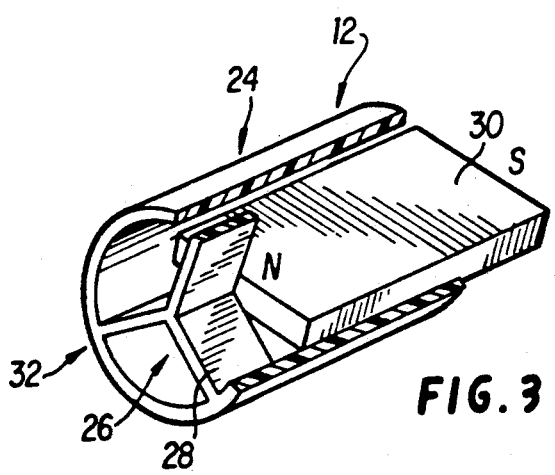

Referring now to the drawings and particularly to FIGS. 1 and 3, a shower arm configured according to the invention is shown generally at 10 to comprise a tubular conduit 12 having an arcuate portion 14 with the first and second end portions being threaded at 20 and 22 respectively to allow fitting of the shower arm 10 into a water circuit as will be described hereinafter relative to FIG. 2. The tubular conduit 12 is conventionally formed of a non-ferrous, non-magnetic material such as copper, brass, plastic or the like. The conduit 12 defines a flow passage through which water passes from a water circuit to a shower head as is conventional in the art. The tubular conduit 12 can be connected into a water circuit in a conventional manner by means of the threads 20 and 22. In such a circuit, one set of the threads, such as the threads 20, facilitates attachment to the water circuit itself while the other set of threads, such as the threads 22, connects directly to a shower head. The arcuate portion 14 of the shower arm 10 can be centrally located along the shower arm 10 or can be disposed toward either end portion 16 or 18. While the shower arm 10 could be formed without the arcuate portion 14 in the tubular conduit 12, the arcuate portion 14 causes a change in direction of water flow through the tubular conduit 12 and thus improves functioning of the shower arm 10. Further, the arcuate portion 14 conveniently allows a shower head to be more easily directed toward a desired location.

Referring particularly to FIG. 3, a cylindrical insert 24 is seen to be formed with an integral baffle element 26 occupying approximately one-half of the interior volume of the insert 24. The baffle element 26 is substantially Y-shaped with each of the outwardly extending elements 28 being of substantially the same length, thereby obviating the convention of referring to the elements 28 as "arms" or "legs". That interior portion of the cylindrical insert 24 not occupied by the baffle element 26, that is, the anterior portion thereof as opposed to the distal portion occupied by the baffle 26, receives one end of a permanent magnet 30 which has the shape of a rectangular solid with a height which is relatively small as compared to the length and width of the magnet 30. In other words, the permanent magnet 30 comprises a flat, bar magnet. The permanent magnet 30 can be maintained within the cylindrical insert 24 by means of adhesive or by friction fit inter alia.

The assembly formed by the insert 24 and the permanent magnet 30 can be referred to as assembly 32. As is best seen in FIGS. 1 and 2, two such assemblies 32 are employed in construction of the shower arm 10, one of the assemblies 32 being fitted into the conduit 12 at the first end portion 16 with a second assembly 32 being fitted into the conduit 12 at the second end portion 18. Since the outer diameter of the cylindrical insert 24 is only slightly less than the inner diameter of the conduit 12, the assemblies 32 are friction fit into the conduit 12 and are flushly received thereinto.

As is best seen in FIG. 3, major planar faces of the permanent magnet 30 are preferably oriented perpendicularly to one of the elements 28 of the baffle element 26. The permanent magnet 30 is seen to be substantially centrally disposed within the conduit 12.

Referring again to FIG. 1 and also to FIG. 2, it is seen that like poles of the two permanent magnets 30 are inserted into the cylindrical inserts 24 with the result that the poles of those portions of the permanent magnets 30 extending from the inserts 24 and thus facing each other within the interior of the conduit 12 are also like poles. In other words, when the north poles of the two permanent magnets 30 are inserted into the cylindrical inserts 24, then the south poles of the two magnets 30 will face each other within the interior of the conduit 12 and vice versa. Functioning of the shower arm 10 is not affected by whether the poles facing each other are north or south poles. As long as the opposing poles are like poles.

Referring again to FIG. 2, the disposition of the shower arm 10 within water circuit 34 is readily seen to occur through use of threaded collars 36 or the like which mount, for example, the first end portion 16 of the shower arm 10 to supply conduit 38 and the second end portion 18 of the shower arm 10 to shower head 40. The structures of the collars 36, supply conduit 38 and shower head 40 can be conventional and can take a variety of forms. In particular, the shower head 40 can be of substantially any type utilized in the industry.

Flow of water through the water circuit 34 from the supply conduit 38 enters the shower arm 10 at the first end portion 16. The disposition of one of the assemblies 32 at the first end portion 16 causes a first conditioning of the water as it "cuts" through the magnetic field produced by the permanent magnet 30. In addition to subjecting the water flowing through the assembly 32 to the magnetic field produced by the magnet 30, the assembly 32 causes turbulence by virtue of the structure of the baffle element 26 and of the disposition of the flat, bar-shaped magnet 30 centrally located within the conduit 12. The turbulence thus induced into the flow of water facilitates maintenance of ionic species within the water and maintains within the water that scale precipitate which forms within the water due to auto-nucleation initiated by passage of the water through the magnetic field produced by the magnet 30. Additional turbulence is generated by the arcuate portion 14 of the shower arm 10 immediately prior to passage of the once-treated water through the second assembly 32 located at the second end portion 18 of the conduit 12. Accordingly, water flowing through the shower arm 10 is twice treated prior to contacting surfaces of the shower head 40, treatment with the magnetic fields of the magnets 30 as preferably disposed within the conduit 12 coupled with turbulence thus induced by the structure inhibiting the formation of scale on surfaces of the shower head 40 by maintaining auto-nucleated scale within the bulk of the water passing through said shower arm 10 and shower head 40.

The spatial orientation of the two magnets 30 at the end portions 16 and 18 of the shower arm 10 is not critical to the invention. The transverse axes of the magnets 30 can be oriented in any angular relation to each other without affecting the function of the shower arm 10.

As is shown in the drawings, anterior ends of each permanent magnet 30 can extend from the respective cylindrical insert within which the magnets are mounted. However, the inserts 24 can be formed of a length which would totally accommodate the respective lengths of the magnets 30 although such a structure is not critical. Similarly, various other modifications and alterations to the shower arm 10 can be accomplished without departure from the intent and scope of the invention. It is therefore to be understood that the invention can be practiced other than as particularly described hereinabove, the scope of the invention being defined by the appended claims.

What is claimed is:

1. A shower arm disposable between a source of water containing scale minerals and a shower head, the shower arm inhibiting the formation of scale minerals on surfaces of the shower head, comprising:
   a conduit through which water passes to reach the shower head, the conduit having an arcuate portion intermediate end portions of said conduit; and,
   first magnetic induction means disposed within the conduit upstream of the arcuate portion for producing a magnetic field within the conduit and,
   second magnetic induction means disposed within the conduit downstream of the arcuate portion for producing a magnetic field within the conduit, the first and second magnetic induction means each comprising
   a permanent magnet having a rectangular solid conformation and wherein the thickness of each magnet is relatively small compared to the length and width of each magnet, the poles of each magnet being located at opposite ends thereof defining said length the width of each magnet being less than the inner diameter of the conduit, each magnet also acting to induce turbulence within water passing through the magnetic field, and
   first and second mounting means for respectively mounting each magnet within the conduit in spaced relation across the arcuate portion of the conduit, each mounting means including a baffle element formed of a plurality of arms substantially equal in length and radiating from a central portion of each baffle element toward walls of the conduit, the arms having a minor dimension thereof facing water flow, major planar faces of each magnet being oriented perpendicularly to one of the arms, the respective baffle elements acting to induce turbulence within water passing through the magnetic field, the magnetic field and turbulence to which the water is subjected on flow through the shower arm acting to inhibit scale formation on surfaces of the shower head.

2. The shower arm of claim 1 wherein the poles of the two magnets facing each other within the conduit are like poles.

3. The shower arm of claim 1 wherein the first and second mounting means each comprise a cylindrical insert element having an outer diameter slightly less than the inner diameter of the conduit, each insert being received within the conduit at respective ends thereof and each insert having one of said baffle elements received therewithin.

4. The shower arm of claim 3 wherein one each of the baffle elements occupies substantially that distal portion of each insert element distal relative to said arcuate portion and one each of the magnets is mounted substantially within the anterior portion of each insert element closest to said arcuate portion.

5. The shower arm of claim 4 wherein the insert element and the baffle element are integrally formed.

6. The shower arm of claim 3 wherein the poles of the two magnets facing each other within the conduit are like poles.

7. The shower arm of claim 3 wherein the insert element and the baffle element are integrally formed.

* * * * *